United States Patent Office 3,062,896
Patented Nov. 6, 1962

3,062,896
POLYPHENOL PREPARATION
Frank C. Davis, Orinda, Calif., assignor to Shell Oil
Company, a corporation of Delaware
No Drawing. Filed Sept. 28, 1959, Ser. No. 842,590
5 Claims. (Cl. 260—619)

This invention relates to novel polynuclear polyphenols and their preparation. More particularly, it relates to an improved process for the preparation of polynuclear polyphenols.

Bisphenols wherein the two phenolic radicals are connected by a mononuclear aromatic radical, such as xylylene bisphenol, have been found to be superior antioxidants for organic polymeric materials such as rubber, polyisoprene, polybutadiene, polypropylene, and the like. Particularly effective are those bisphenols having the structure

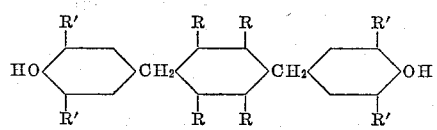

wherein each R is an alkyl radical and each R' is a tertiary alkyl radical, the alkyl radicals preferably having up to 8 carbon atoms. Not only do these compounds afford excellent protection against autooxidation, atmospheric attack and sun-checking, but their particular structure renders them exceptionally miscible with the polymeric materials noted. In such materials, it has been observed that they are non-migratory and, even when incorporated in materials having large surface areas, substantially non-volatile.

The condensation of phenols with alpha,alpha'-dichloroxylenes in hydrocarbon solvents to yield trinuclear bisphenols with the evolution of hydrogen chloride has been described in the literature. While this reaction is virtually quantitative for some types of reactants, it has been found to be particularly unsuitable for the condensation of 2,6-di-tert-alkylphenol with 1,4-bis(halomethyl)tetraalkylbenzene to yield the bisphenolic products represented above. The difficulty in directly condensing the 2,6-di-tert-alkylphenol with 1,4-bis(halomethyl)tetraalkylbenzene results primarily from the fact that in 2,6-dialkylphenols the para position is far less reactive than in phenol itself. Furthermore, the direct alkylation of phenols having branched alkyl substituents with benzyl chloride is necessarily conducted under such acidic conditions that extensive dealkylation of the phenol takes place. Not only are relatively acidic Friedel-Crafts catalysts, such as zinc chloride, required to obtain reasonable rates, but in the alkylation hydrogen chloride is liberated in the reaction medium. Such direct alkylation, even in the presence of the noted catalysts, is also a very slow reaction, requiring times on the order of several days to reach perceptible yields of product.

As a consequence, the best yield obtained when reacting a typical diortho-substituted phenol, 2,6-di-tert-butylphenol, with bis(chloromethyl)durene, in repeated experiments was only about 14%.

It has now been found that the preparation of these 1,4-bis(3,5-di-tert-alkyl-4-hydroxybenzyl)tetraalkylbenzenes can be accomplished rapidly and in high yield by employing as a reactant an unusual metal derivative of 2,6-di-tert-alkylphenol which has been found to be considerably more reactive than the phenol itself, and by conducting the reaction in a polar solvent having particular characteristics.

It is therefore an object of this invention to provide a novel process for preparing 1,4-bis(3,5-di-tert-alkyl-4-hydroxybenzyl)tetraalkylbenzenes. Another object of the invention is the provision of a process for preparing such compounds rapidly and in high yield. Another object is a process for preparing such benzene compounds from unusual metal salts of 2,6-di-tert-alkylphenol. Provision of a process for preparing the benzene bisphenols in a particular type of polar solvent is another object of the invention. Other objects will be apparent from the following description of the process.

These objects are accomplished in the invention by a process for preparing 1,4-bis(3,5-di-tert-alkyl-4-hydroxybenzyl)tetraalkylbenzene comprising reacting together in an inert organic solvent having a dielectric constant of at least about 20, the alkali metal salt of 2,6-di-tert-alkylphenol and 1,4-bis(halomethyl)tetraalkylbenzene, each of said alkyl groups having up to eight carbon atoms, and separating 1,4-bis(3,5-di-tert-alkyl-4-hydroxybenzyl)tetraalkylbenzene from the reaction mixture. This process may best be understood by consideration of the nature of the reactants and the manner in which the process is conducted.

The reaction is effected by reacting together in a particular class of polar solvents in alkali metal salt of a 2,6-di-tert-butylphenol and 1,4-bis(halomethyl)tetraalkylbenzene. The alkali metal salts of 2,6-di-tert-alkylphenol are those compounds which act as though the alkali metal ion is substituted in the para position of the phenol. They may, in general, be pictorially represented by the tautomeric formulae

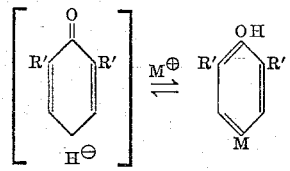

wherein each R' is a tertiary alkyl group and M is an alkali metal atom, e.g., Na, Li or K.

Polyphenol products of the reaction wherein each phenolic hydroxyl group is highly hindered are exceptionally useful as antioxidants. As a consequence, preferred phenolic salt reactants are those wherein each of the alkyl groups is tertiary and has from 4 to 8 carbon atoms. These include sodium and potassium salts of 2,6-di-tert-butylphenol, 2,6-di-tert-amylphenol, 2-tert-butyl-6-tert-amylphenol and 2,6-di-tert-octylphenol.

These alkali metal salts of 2,6-di-tert-dialkylphenols are condensed with 1,4-(halomethyl)tetraalkylbenzene in certain polar solvents. The 1,4-bis(halomethyl)tetraalkylbenzene is a compound wherein each of the 2, 3, 5 and 6 carbon atoms on the benzene ring is substituted with an alkyl radical, preferably one having from one to eight carbon atoms. Compounds having longer alkyl radical substituents or having such other substituents as aromatic or heterocyclic side chains are less reactive and therefore less desirable for use in the process of the invention. Such compounds are characterized by the structure

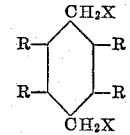

wherein each X is a halogen atom and each R is an alkyl radical having up to eight carbon atoms. The halogen atoms may be fluorine, chlorine, bromine, or iodine and both may be the same, or they may be different. Similarly, the alkyl radicals may be the same or they may be different. Exemplary compounds include 1,4-bis(chloromethyl)-2,3,5,6-tetraethylbenzene; 1,4-bis(iodomethyl)-2,5-dimethyl-3,6-dipropylbenzene; 1,4-bis(bromomethyl)-2,3,5-tributyl-6-ethylbenzene; 1,4-bis(chloromethyl)-2-isopropyl-3,5,6-trimethylbenzene; 1-chloromethyl-4-bromomethyl-2,3,5,6-tetrahexylbenzene; and the like.

Preferred because of their symmetry and east of reaction are the 1,4-bis(halomethyl)tetraalkylbenzenes wherein both halogen atoms are the same and are selected from chlorine and bromine, and wherein all four substituents have the same number of carbon atoms. Of these, the best product is obtained from bis(chloromethyl)durene, 1,4-bis(chloromethyl)-2,3,5,6-tetramethylbenzene.

Although the bis(halomethyl)tetraalkylbenzene reactant is soluble in conventional inert liquid hydrocarbon reaction media, such as benzene, toluene, decane and the like, the alkali metal salts of 2,6-di-tert-alkylphenols are relatively insoluble. As a consequence, reaction between the two classes of reactants in such media is slow and incomplete, since the reaction takes place at the interface between the solid salt and the dissolved bis(halomethyl)-benzene compound. It has been found, however, that the reaction proceeds rapidly and to high yield in an organic solvent which does not react with the noted reactants and whose dielectric constant is in excess of about 20.

Such solvents comprise aromatic, aliphatic and cycloaliphatic radicals having electrophilic substituents which lend them their dielectric properties, or mixtures thereof. Particularly preferred electrophilic substituents are the nitrile radical —CN, the nitro radical —NO$_2$, and the amido radical $$-\overset{O}{\underset{\|}{C}}-NH_2$$

The properties required of these solvents is that they have dielectric constants ε in excess of about 20 and that they be liquid under the reaction conditions. Exemplary of such compounds are formamide, acetamide, nitromethane, acetonitrile, methyl thiocyanate, nitroethane, malononitrile, propionitrile, ethyl thiocyanate, succinonitrile, crotonitrile, butyronitrile, nitrobenzene, benzonitrile, nitrotoluene as well as tetrahydrofurane and sulfolane. Properties of typical solvents are presented in the following table.

| Solvent | ε | M.P. | B.P. |
|---|---|---|---|
| Acetonitrile | 37.5 | −41 | 82 |
| Dimethyl formamide | 26.6 | −61 | 158 |
| Propionitrile | 27 | −92 | 97 |
| Nitrobenzene | 34.82 | 5.7 | 210.9 |
| Nitroethane | 28 | −50 | 114.8 |
| p-Nitrotoluene | 22 | 51.3 | 238 |

Compounds of the types described have the properties of dissolving both the alkali metal phenol salt and the di(halomethyl)benzene reactants without participating themselves in the reaction.

Organic nitriles and amides liquid in the temperature range 20°–100° C. appear to be the most useful solvents. Of these, the most preferred liquid is dimethyl formamide, which combines the best solvency and boiling point characteristics with a most satisfactory dielectric constant.

The reaction is conveniently conducted by adding the di(halomethyl) reactant to a solution of the dialkyl phenol salt, and separating the polynuclear phenol product from the reaction mixture after all of the dihalide has been added. The alkali metal salt of 2,6-dialkylphenol may be readily prepared in situ, for example, by dissolving 2,6-dialkylphenol and such an alkali metal alcoholate as potassium t-butoxide in the polar solvent, e.g., dimethyl formamide, and distilling the product alcohol from the mixture as it forms.

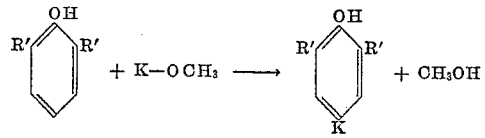

thus leaving the salt in the solvent. To the resulting solution the dihalide compound is added, preferably in about stoichiometric amount,

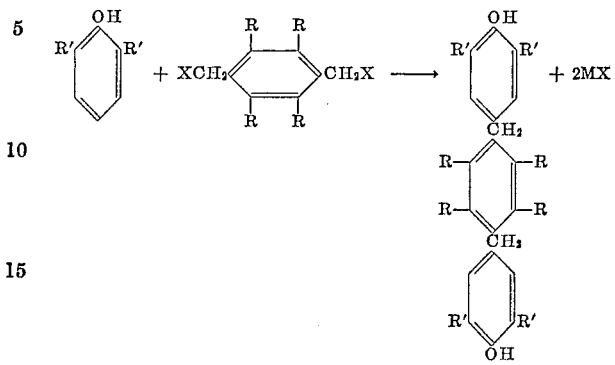

wherein each R' is a tertiary alkyl radical, each R is an alkyl radical, the alkyl radicals preferably having up to 8 carbon atoms, M is an alkali metal atom, and each X is halide atom.

The reaction is generally exothermic at about room temperature or slightly above and takes place without the necessity of added catalyst. The reaction is therefore preferably conducted at a temperautre between about 20° and 80° C. and at atmospheric pressure. Subatmospheric or superatmospheric pressures may, of course, be employed, but they confer no additional advantages on the conduct of the process. At lower temperatures the reaction proceeds slowly, while at higher temperatures than those specified it proceeds with undesirable rapidity. Because oxidation of the reactants produces undesirable side reactions, however, it is desirable to conduct the process under an inert atmosphere, e.g., nitrogen, carbon dioxide, helium, etc. While the reactants may be employed in any relative proportions under these conditions, it has been found that phenol salt/di(halomethyl)benzene ratios of from about 5/1 to about 1/5 are convenient, while about stoichiometric proportions of the reactants are preferred.

Since the presence of water in the reaction medium causes the phenol salts to revert to free phenols and metal hydroxides, the reaction is most conveniently conducted under substantially anhydrous conditions, for example, by employing water-free solvent and reactants. By "substantially anhydrous" is meant a reaction environment containing no more than trace amounts of water.

When the reaction is complete, the polynuclear polyphenol product may readily be separated from the reaction mixture by conventional methods, such as distillation, preferably under reduced pressure, extraction and the like. For example, when water is added to a dimethyl formamide solution containing product 1,4-bis(3,5-di-tert-butyl-4-hydroxybenzyl)durene and potassium chloride, a semicrystalline mass of mixed products is precipitated from which the durene bisphenol is readily separated by conventional methods, such as trituration with a selective solvent, e.g., isopropanol, methanol, ethanol or the like.

It will be evident that the process of the invention may be conducted in a batch, semibatch or continuous manner in conventional chemical process equipment and with commonly available reagents.

To further illustrate the process of the invention, the following specific examples are set forth. It should be understood, however, that these examples are merely illustrative and are not to be regarded as limitations to the appended claims since the basic teachings thereof may be varied at will as will be understood by those skilled in the art. In the examples, the proportions are expressed in parts by weight unless otherwise indicated.

*Example I*

To a stirred degassed suspension of 56 g. (0.50 mole)

of potassium t-butoxide in 500 ml. of mixed xylenes was added 113 g. (0.55 mole) of liquid 2,6-di-tert-butylphenol. The addition was carried out with vigorous stirring at 80–90° C. under a nitrogen atmosphere over a 15-minute period, at the end of which a thick suspension of the potassium salt of 2,6-di-tert-butylphenol having the following formula

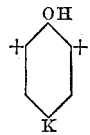

was obtained. The mixture was then boiled at temperatures up to 139° C. to remove the tert. butyl alcohol produced.

After removal of the alcohol, the mixture was cooled to about 60° C. and to it was added a suspension of 58 g. (0.25 mole) of bis(chloromethyl)durene in 200 ml. of xylene, in five equal portions over a 30-minute period. When the addition was complete, the resulting xylene suspension of a cream-colored solid was refluxed for about 2½ hours, and then allowed to cool under nitrogen.

The cold mixture, containing an amber-colored solid, was mixed with 250 ml. of distilled water and stirred vigorously for an hour to remove the potassium chloride. After separation of the aqueous and organic phases, the former was removed and the latter washed with three 300-ml. portions of saturated aqueous sodium bicarbonate. The resulting clear dark red-brown xylene solution was dried over anhydrous magnesium sulfate and filtered. The xylene was then stripped from the filtrate and the dark red-brown residue taken up in 300 ml. of isopropanol.

The resulting isopropanol solution was seeded with a few crystals of 1,4-bis(3,5-di-tert-butyl-4-hydroxybenzyl) durene and allowed to stand at about 0° C. On standing overnight, the solution had deposited a modest crop of granular crystals. These were recovered by filtration, washed with isopropanol and dried in vacuo. In this manner 26 g. of a light beige powder having a melting point of 183–189° C. was obtained. Subsequent recrystallization of this powder gave a somewhat lower yield of fine pure-white needles having a melting point of 195–197° C. and whose infrared absorption spectrum corresponded exactly to that of a pure sample of 1,4-bis(3,5-di-tert-butyl-4-hydroxybenzyl) durene prepared in another manner.

Example II

To a three-necked reaction flask fitted with a glass stirrer and a Vigreux-type distillation column was added, under nitrogen, one liter of xylene and 226 g. (1.10 mole) of 2,6-di-tert-butylphenol. The mixture was heated to about 80° C. and nitrogen bubbled through it to remove dissolved air. The mixture was then cooled and to it was added 54 g. (1.0 mole) of sodium methoxide. The resulting pale green mixture was heated to boiling and the methanol distilled off as it formed. At the end of 45 minutes all the methanol had been removed and a cream-colored precipitate of the sodium salt of 2,6-di-tert-butylphenol having the following formula

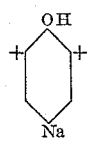

remained suspended in the xylene. The mixture was then cooled and allowed to stand under nitrogen.

After the precipitate had settled, the xylene was decanted off and the remaining sludge was washed with three successive portions of isopentane. The washed precipitate was then dried under nitrogen over a steam bath.

To the dry sodium salt was added 700 ml. of freshly dried and redistilled acetonitrile, and the resulting solution, upon heating to reflux, was dark green. Using a nitrogen-purged powder-addition flask, 116 g. (0.50 mole) of recrystallized bis(chloromethyl)durene was added to the solution in a portionwise manner. The mixture was refluxed for 36 hours on a steam bath, and then cooled and filtered under nitrogen. In this way, 57 g. of NaCl was recovered.

The filtrate was stripped of solvent under reduced pressure leaving 276 g. of a yellow oil which crystallized on standing. Upon recrystallization of this residue from isopropanol and from isooctane, 53 g. (27% yield) of 1,4-bis(3,5-di-tert-butyl-4-hydroxybenzyl)durene was obtained.

Example III

The procedure employed in Example II was repeated except that dimethyl formamide was employed as the solvent in place of acetonitrile. A 67% yield of the 1,4-bis(3,5-di-tert-butyl-4-hydroxybenzyl) durene was obtained.

Example IV

The potassium salt of 2,6-di-tert-butylphenol was prepared by dissolving 252 g. (1.5 mole) of potassium t-butoxide in 750 ml. of freshly distilled dimethyl formamide under nitrogen and adding 309 g. (1.50 mole) of 2,6-di-tert-butylphenol to the resulting solution. The tert-butyl alcohol product was distilled off at 20 mm. pressure and 60–70° C.

To the resulting solution was added 174 g. (0.75 mole) bis-(chloromethyl) durene over a period of 1.5 hours, while maintaining the temperature of the reaction mixture at 65–67° C. The mixture was stirred at 65–70° C. for another seven hours and then cooled. To it was added 500 ml. of water, and a yellow-brown oil which separated from the aqueous phase crystallized in a few minutes.

The crude semi-crystalline product was filtered from the mixture and dried on the filter by suction. The damp residue was triturated with 500 ml. of isopropanol at room temperature and refiltered. After drying the powder in vacuo 255 g. of almost white crude product (M.P. 186–192° C.) was obtained, a 60% yield.

This preparation may alternatively be conducted by using acetonitrile as a solvent in place of the dimethyl formamide.

I claim as my invention:

1. The preparation of 1,4-bis(3,5-di-tert-alkyl-4-hydroxybenzyl)tetraalkylbenzene, comprising reacting together the alkali metal salt of 2,6-di-tert alkylphenol, and 1,4-bis(halomethyl)tetraalkylbenzene, each of said alkyl groups having up to eight carbon atoms, under an inert atmosphere in an inert substantially anhydrous organic solvent of dielectric constant of at least about 20 and selected from the group consisting of formamide, dimethyl formamide, acetamide, nitromethane, nitroethane, acetonitrile, propionitrile, butyronitrile, methyl thiocyanate, ethyl thiocyanate, tetrahydrofurane and sulfolane.

2. The preparation of 1,4-bis(3,5-di-tert-alkyl-4-hydroxybenzyl) durene, comprising reacting together the alkali metal salt of 2,6-di-tert-butylphenol, and 1,4-bis-(halomethyl) durene under an inert atmosphere in substantially anhydrous dimethyl formamide.

3. The preparation of 1,4-bis(3,5-di-tert-butyl-4-hydroxybenzyl) durene, comprising reacting together the alkali metal salt of 2,6-di-tert-butylphenol, and 1,4-bis-(halomethyl) durene under an inert atmosphere in substantially anhydrous sulfolane.

4. The preparation of 1,4-bis(3,5-di-tert-butyl-4-hydroxybenzyl) durene, comprising reacting together the potassium salt of 2,6-di-tert-butylphenol, and 1,4-bis-(chloromethyl) durene under an inert atmosphere at a temperature between about 20° C. and about 80° C. in substantially anhydrous dimethyl formamide.

5. The preparation of 1,4-bis(3,5-di-tert-butyl-4-hydroxybenzyl) durene, comprising reacting together the potassium salt of 2,6-di-tert-butylphenol, and 1,4-bis- (chloromethyl) durene under an inert atmosphere at a temperature between about 20° C. and about 80° C. in substantially anhydrous sulfolane.

References Cited in the file of this patent

UNITED STATES PATENTS

| | | |
|---|---|---|
| 2,634,297 | Moyle | Apr. 7, 1953 |
| 2,903,346 | Coffield | Sept. 8, 1959 |

OTHER REFERENCES

Nauta et al.: Rec. trav. Chim., vol. 55 (1936), 1000–1006 (7 pages). (Patent Office Library.)

Fieser et al.: "Organic Chemistry," 3rd Ed. (1956), page 1112 (1 page). Pub. by Reinhold Pub. Corp., N.Y. (38) "Solvent." (Patent Office Library.)